United States Patent [19]

Porth et al.

[11] Patent Number: 4,759,213

[45] Date of Patent: Jul. 26, 1988

[54] ARRANGEMENT HAVING AN AIR-MASS METER FOR AN INTERNAL COMBUSTION ENGINE

[75] Inventors: Wolfgang Porth, Frankfurt am Main; Wolfgang Weibler; Eckhardt Kern, both of Hofheim a. T.; Thomas Hannewald, Griescheim; Reiner Weingärtner, Hofheim a. T., all of Fed. Rep. of Germany

[73] Assignee: VDO Adolf Schindling AG, Frankfurt am Main, Fed. Rep. of Germany

[21] Appl. No.: 926,453

[22] Filed: Nov. 3, 1986

[30] Foreign Application Priority Data

Nov. 2, 1985 [DE] Fed. Rep. of Germany ....... 3539016

[51] Int. Cl.⁴ .............................................. F02D 41/00
[52] U.S. Cl. ..................................... 73/118.2; 123/494
[58] Field of Search ............... 123/445, 470, 472, 494, 123/198 E; 73/118.2

[56] References Cited

U.S. PATENT DOCUMENTS

| 3,945,349 | 3/1976 | Elsbett et al. | 123/52 M |
| 4,304,129 | 12/1981 | Kawai et al. | 73/118.2 |
| 4,373,491 | 2/1983 | Knapp | 123/472 |
| 4,375,204 | 3/1983 | Yamamoto | 123/494 |
| 4,416,241 | 11/1983 | Knapp et al. | 123/470 |
| 4,446,824 | 5/1984 | Endo et al. | 123/494 |
| 4,493,304 | 1/1985 | Nakajima et al. | 123/494 |

FOREIGN PATENT DOCUMENTS

| 58-200071 | 11/1983 | Japan | 123/494 |
| 2082252 | 3/1982 | United Kingdom | 123/470 |

Primary Examiner—Andrew M. Dolinar
Attorney, Agent, or Firm—Martin A. Farber

[57] ABSTRACT

In an arrangement having an air-mass meter for an internal combustion engine, a measurement tube passes through a division wall which separates the interior of an air filter from a pulsation-damping space. In this way, a compact structural shape is obtained which takes into account the conditions of flow of the intake port of an internal combustion engine, particularly of an automotive vehicle. The structure is economical to manufacture, and operates dependably.

21 Claims, 3 Drawing Sheets

ARRANGEMENT HAVING AN AIR-MASS METER FOR AN INTERNAL COMBUSTION ENGINE

FIELD AND BACKGROUND OF THE INVENTION

The invention concerns a system having an air-mass meter for an internal combustion engine in which the measurement place of an air-mass meter is located in a measurement tube.

For the regulating of internal combustion engines with fuel injection, it is necessary to measure the mass of air drawn in by the engine. Mechanical systems for this purpose are known which operate, for instance, with movable flaps or aperture plates which extend into the stream of air. Sensors are also known, for instance hot-wire air-mass meters, for the measurement of the mass of air. They have the advantage that they have no moving, parts and interfere less with the flow of air than the mechanical systems do. Furthermore, the result of the measurement is independent of differences in altitude, which is not true of the mechanical systems, which primarily measure the quantity of air.

Various different methods have been employed for the arrangement of the air-mass or air-quantity meters. Thus it is known, for instance, to arrange an air-mass meter operating by ultrasonics within an air filter. In this case, the measurement place of the air-mass filter is so arranged within a measurement tube that the air flowing within the air filter moves over the outside of the measurement tube in the region of the measurement place. In this way assurance is had that the measurement tube substantially assumes the temperature of the air drawn in, which, in its turn, is of essential importance for the operation of the air-mass ultrasonics meter. The known construction adapted to an air-mass meter operating by ultrasonics has, however, structural disadvantages and, for instance, does not assure a sufficient damping of pulsations of the air or of the air/fuel mixture within the intake channel.

SUMMARY OF THE INVENTION

It is an object of the present invention to provide an arrangement with an air-mass meter which substantially takes into account the fluid mechanics of the intake channel of an internal combustion engine, particularly of an automotive vehicle, is economical to manufacture and operates reliably.

According to the invention, the measurement tube (14) passes through a division wall (7) which separates the inner space (4) of an air filter (1) from a pulsation-damping space (6).

According to further features, the measurement tube (14) extends approximately equally into the interior (4) of the air filter (1) and the pulsation-damping space (6).

Still further, the measurement place (15) is arranged in the vicinity of the division wall (7).

A particularly compact construction is obtained by the arrangement within the pulsation-damping space (6) of a fuel-injection valve (8) whose nozzle (9) faces a tube (10) which contains a throttle valve (11) and leads to the internal combustion engine.

In order to prevent parts of the injected mist of fuel from not going directly into the intake channel of the engine but first passing into the pulsation-damping space, the tube (10) which leads to the internal combustion engine can, in accordance with another feature, extend in funnel shape into the pulsation-damping space (6).

Also according to the invention, the division wall (7) is provided, in the vicinity of the fuel-injection valve (8), with a bulge (23) which extends into the interior of the air filter.

For the better guidance of the air within the pulsation-damping space, guide elements (13) can be arranged in the vicinity of the nozzle (9).

One advantageous further development of the arrangement in accordance with the invention consists in the pulsation-damping space (6) being enclosed by a housing (5) on which the division wall (7) and the air filter (1) can be placed.

In order to be able to use compact air filters which have proven their suitability, the interior (4) of the air filter (1) and the pulsation-damping space (6) can each have the shape of a flat cylinder, in accordance with another feature of the invention.

Further, the measurement tube (14) and/or the fuel injection valve (8) can be arranged asymmetrically.

Still further, the division wall (7) is airtight.

Other features of the invention provide for a hydraulically favorable development of the flow tube, namely in the manner that at least one opening (17, 19) of the measurement tube terminates in collar shape and/or that the measurement tube (14) contains a flow straightener (18) in the vicinity of its inlet opening (17) and/or a protective grid (20) in the vicinity of its outlet opening (19).

Furthermore, in order to improve the flow in the vicinity of the sensor, the diameter of the flow tube can be smaller at the place of measurement than at the inlet opening.

Further according to the invention, the measurement tube (14) can be developed as a Venturi nozzle within whose narrowest cross section the place of measurement (15) is arranged.

Although the invention is directed primarily at the use of thermal sensors at the measurement place, for instance hot wire sensors, the advantageous use of other sensors, for instance ultrasonic sensors, is entirely possible.

For the operation of the sensors in question, electric circuits are required, which are preferably arranged in the vicinity of the sensor.

In accordance with further features of the invention, the electric circuit (16) associated with the sensor (15) is arranged in the vicinity of the measurement tube (14) on the division wall (7). The necessary cooling of the electric circuit can be effected either by the filtered intake air or in the manner that the division wall serves as cooling member if—in accordance with another feature of the invention—the electric circuit (16) is in heat-conductive connection with the division wall (7).

Finally, it is possible to arrange additional electric circuits (22) on the division wall (7) within the air filter, for instance a control circuit which evaluates the signals of the air-mass meter and possibly other sensors. In such case, in addition to the advantage of the cooling there is also the further advantage that different elements which belong to a control system and thus functionally belong together are also physically arranged within one structural unit.

Also according to a feature of the invention, the measurement tube (14) is inclined to the central axis of the air filter.

BRIEF DESCRIPTION OF THE DRAWINGS

With the above and other objects and advantages in view, the present invention will become more clearly understood in connection with the detailed description of preferred embodiments, when considered with the accompanying drawings, of which.

Identical parts have been provided with the same reference numbers.

DETAILED DESCRIPTION OF THE PREFERRED EMBODIMENT

Figure 1:
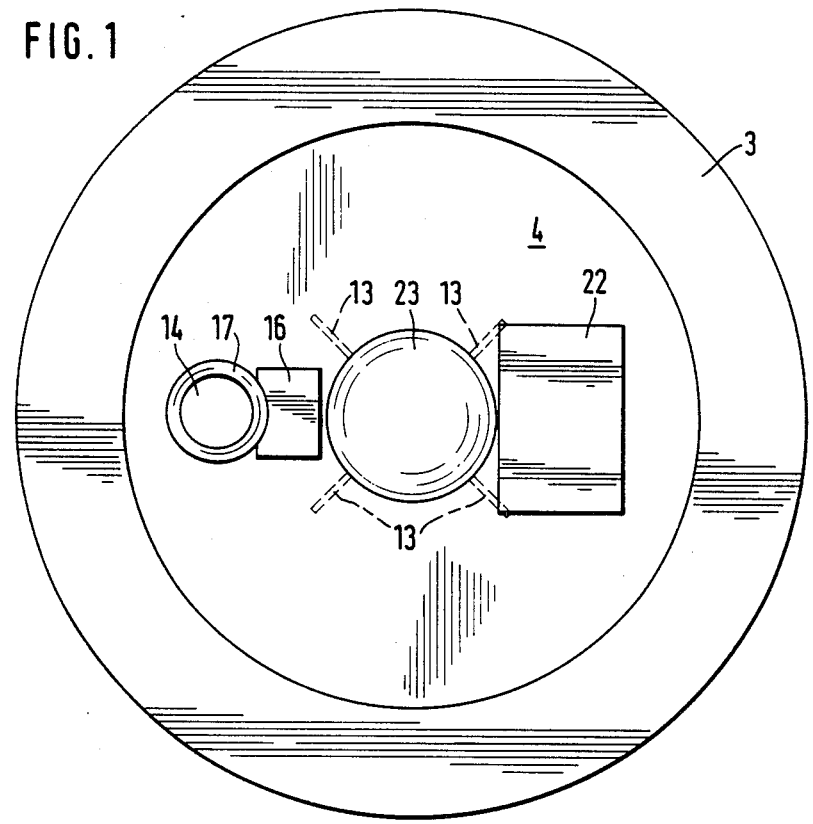
FIG. 1 is a plan view of the arrangement.
Figure 2:
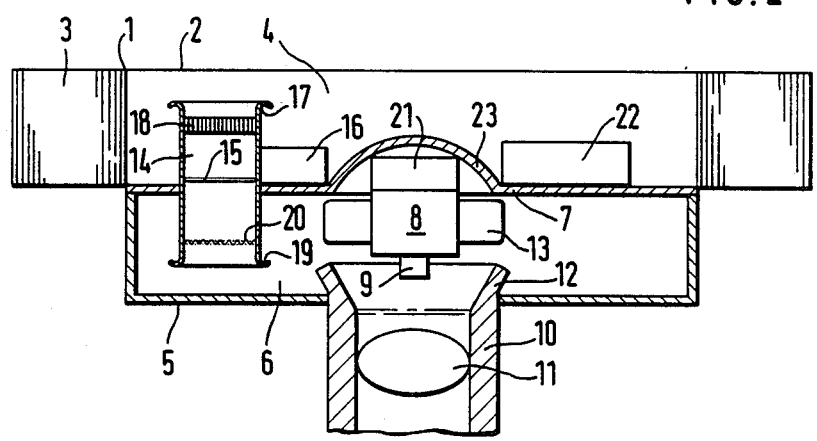
FIG. 2 is a longitudinal section of an embodiment of the invention.

The air filter 1 with housing 2 is a known air filter having the shape of a flat cylinder, such as used in by far the most gasoline engines. Instead of a pipe connection for the intake connection it is, however, open at the bottom. However, it is closed off by a division wall 7 which separates the inside 4 of the filter from the hollow space lying below it, which space will be described in further detail below. In the figure, the ring-shaped filter material 3 itself is shown merely diagrammatically.

The housing 5, which bears the air-filter 1 and the division wall 7, is connected to a pipe 10 which forms the intake port of the internal combustion engine, not shown. The throttle valve 11 is arranged within the pipe 10. An injection valve 8 located above the inlet opening of the pipe 10 injects the fuel into the air which enters directly into the pipe 10. In order that a part of the particles of fuel sprayed by the nozzle 9 do not pass into regions of the air which does not flow directly into the pipe 10, a funnel-shaped widening 12 of the pipe 10 can be provided. Guide elements 13 contribute to calming the air flow in the space in front of the nozzle 9.

For the sake of clarity in the drawings, a mounting for the injection valve within the housing 5 has not been shown. However, any man skilled in the art can design such a mounting.

The injection valve 8 can be combined as a single unit with a system pressure regulator 21, which is known per se. Conduits are provided for the feeding and return of the fuel, but they have not been shown in the drawing.

The hollow space 6 of the housing 5 forms a pulsationdamping space. As is known, in piston-type internal combustion engines, the intake takes place in pulsating fashion. This pulsation makes itself noticeable throughout the entire intake system. For an accurate measurement of the mass of air, however, uniform flow is required within the air-mass meter; the pulsation therefore falsifies the result of the measurement.

The measurement tube 14 which contains the sensor 15 is held in the division wall in such a manner that it extends approximately equally into the hollow space 6 and the interior 4 of the air filter 1. In order to obtain the smallest possible resistance to flow and to form a well-defined course of the flow within the measurement tube 14, the inlet opening 17 and the outlet opening 19 are developed in collar shape.

Near the outlet opening 19 there is arranged a protective grid 20, while a flow straightener 18 is arranged at the inlet opening 17, it consisting in known manner of a plurality of channels formed in a suitable material.

As already mentioned above, different types of sensors can be used in the arrangement of the invention. A preferred type of sensor 15 is a thermal sensor in which a wire stretched out in the measurement tube or a conductor arranged on an insulating board is traversed by current so that they definitely heat up to above the temperature of the air flowing past. By means of the temperature-dependent resistor, the temperature of the conductor can be brought to constant value in an electric circuit 16, more or less current flowing through the conductor depending on the mass of air which flows past. In order to compensate for the influence of the temperature of the air, a comparison conductor can be arranged in the vicinity of the electrically heated measurement conductor. Only a small amount of current flows through the comparison conductor so that its temperature corresponds substantially to the temperature of the air.

For the purpose of the electrical connections of the sensor 15 to the corresponding electric circuit 16, said circuit is arranged in the immediate vicinity of the sensor 15 or measurement tube 14. It has proven particularly favorable to arrange the electric circuit 16 in the interior of the air filter and fasten it to the division wall 7. In this case, the air drawn in through the filter 1 serves to cool the electric circuit 16 and, with good thermal contact between the circuit 16 and the division wall 7, the effective cooling surface for giving off heat to the air is substantially increased.

Aside from the electric circuit 16, there can also be provided in the interior 4 of the air filter 1 another circuit 22 which is connected to the circuit 16. The circuit 22 contains the known circuits necessary for electronic injection control. By the provision of the additional circuit 22 in this region on the division wall 7, not only is good cooling obtained but the path of electric lines between the circuit 16 and the circuit 22 as well as the injection valve 8 is considerably simplified. Furthermore, it is favorable for purposes of maintenance that the said three components of the injection control system be arranged within a single structural group.

Figure 3:
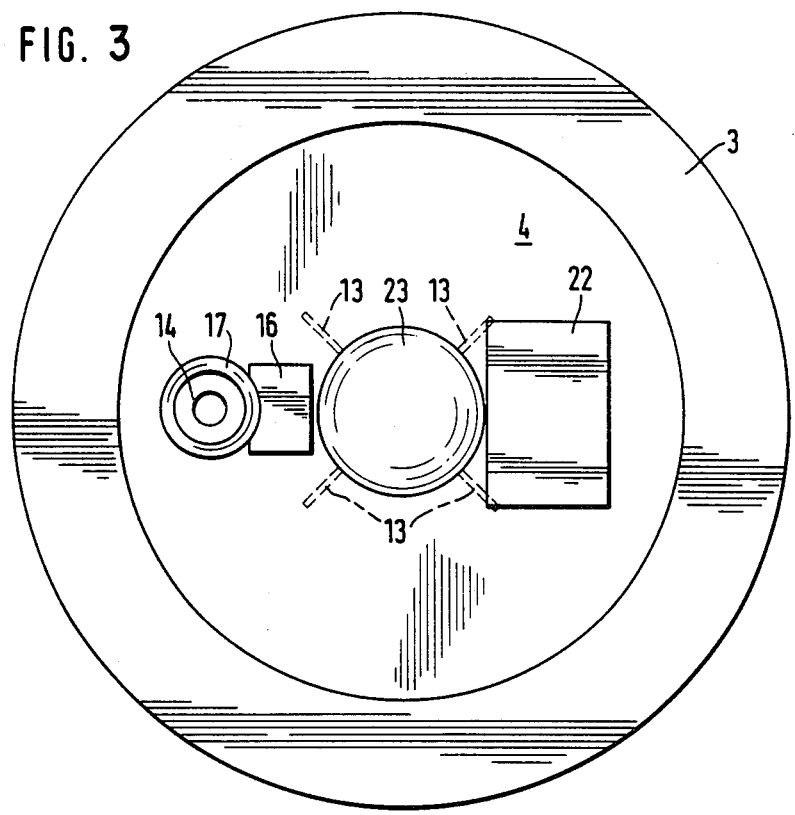
FIGS. 3-6 show two alternative embodiments of the invention.
Figure 4:
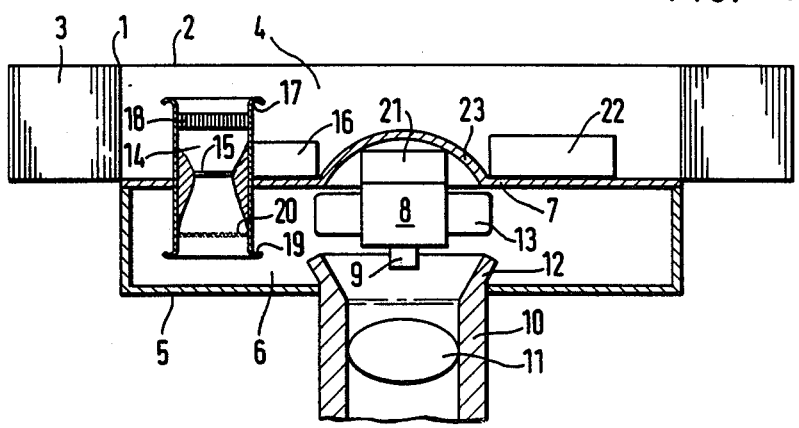
Figure 5:
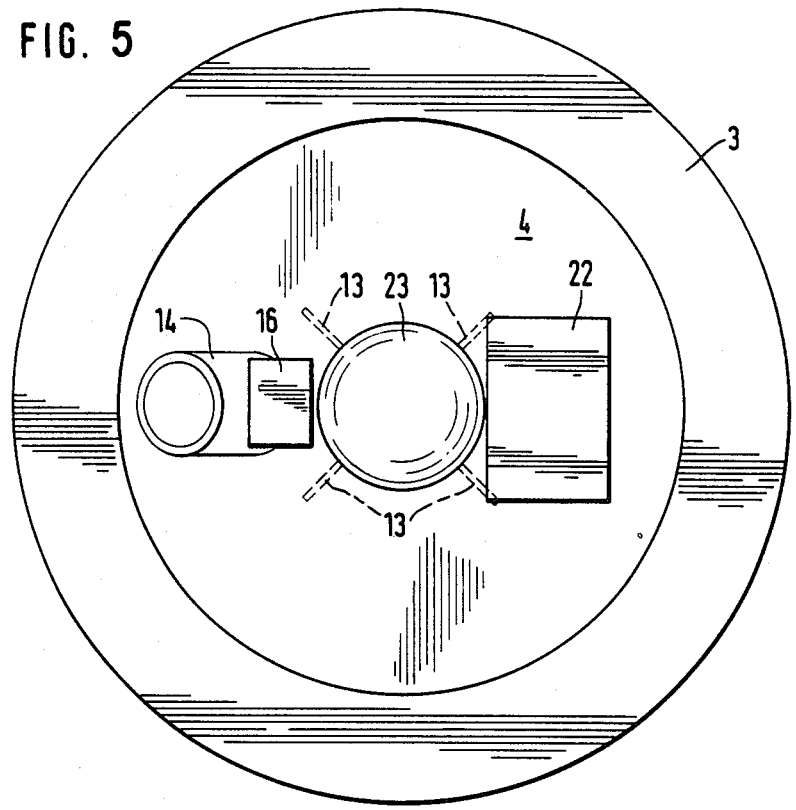
Figure 6:
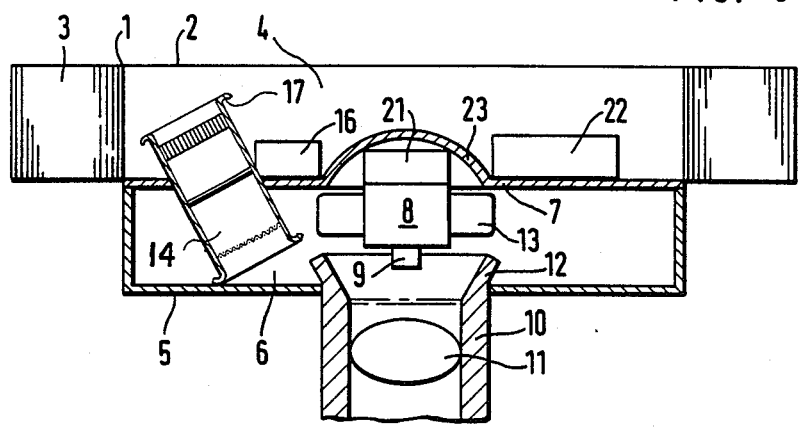

The invention is not limited to the embodiment shown but covers other advantageous embodiments. Thus, for instance, the measurement tube 14 can be placed obliquely, as shown in FIGS. 5 and 6, so that, with the same dimensions of the overall arrangement, a longer measurement path is made possible. It is also possible for the measurement tube 14 to be developed as a Venturi nozzle with the point of measurement at the narrowest cross section, as shown in FIGS. 3 and 4. Both of these measures contribute to improving the conditions of flow which are then substantially the same for different operating conditions and the same mass flow.

We claim:

1. In a system including an air-mass meter for use with an internal combustion engine having a pulsation-damping space communicating with an intake pipe of the engine, wherein a measurement place of the air-mass meter is located in a measurement tube, the improvement comprising an air filter having a peripheral wall defining an interior space inside said peripheral wall;

a division wall separating said interior space of said air filter from said pulsation-damping space; and wherein said measurement tube is transversely spaced from said intake pipe and passes through said division wall; and said division wall extends transversely of said intake pipe to define, with said peripheral wall, a transversly extending shape to said interior and said pulse-damping spaces, said tube and said pipe extending from opposite directions into said pulsation-damping space.

2. The system according to claim 1, wherein the measurement place is located adjacent said division wall.

3. a housing enclosing said pulsation-damping space, said division wall and said air filter being mountable on said housing.

4. The system according to claim 1, wherein the interior of the air filter and the pulsation-damping space each have the shape of a flat cylinder.

5. The system according to claim 1, wherein said measurement tube is arranged asymmetrically.

6. The system according to claim 1, wherein said divisional wall is airtight.

7. The system according to claim 1, wherein said measurement tube has at least one opening which terminates in collar shape.

8. The system according to claim 1, further comprising
a flow straightener located in said measurement tube in the vicinity of an inlet opening of said measurement tube.

9. The system according to claim 1, further comprising
a protective grid disposed in said measurement tube in the vicinity of an outlet opening of said measurement tube.

10. The system according to claim 1, wherein said measurement tube is a Venturi nozzle having a constriction, said measurement place being at said constriction.

11. The system according to claim 1, further comprising
a sensor located at the measurement place.

12. The system according to claim 11, wherein said sensor is a thermal sensor located at the measurement place.

13. The system according to claim 12, further comprising
an electric circuit operative with said sensor, and is located in the vicinity of the measurement place and on said division wall.

14. The system according to claim 13, wherein said electric circuit is thermally coupled to said division wall.

15. The system according to claim 14, wherein said electric circuit is located in said interior space of said air filter.

16. The system according to claim 13, further comprising
an additional electric circuit mounted on said division wall.

17. The system according to claim 16, wherein said electric circuits are located in said interior space of said air filter.

18. The system according to claim 11, wherein said measurement tube is inclined to the central axis of the air filter.

19. The system according to claim 1, wherein said measurement tube is axially parallel to the axis of the intake pipe laterally displaced therefrom.

20. In a system including an air-mass meter for use with an internal combustion engine having a pulsation-damping space communicating with an intake pipe of the engine, wherein a measurement place of the air-mass meter is located in a measurement tube, the improvement comprising
an air filter having a peripheral wall defining an interior space inside said peripheral wall;
a division wall separating said interior space of said air filter from said pulsation-damping space; and wherein
said measurement tube is axially offset with respect to said intake pipe and passes through said division wall
said measurement tube extends approximately equally into said interior of the air filter and said pulsation-damping space being supported on said division wall approximately at a middle position of said tube.

21. In a system including an air-mass meter for use with an internal combustion engine having a pulsation-damping space communicating with an intake pipe of the engine, wherein a measurement place of the air-mass meter is located in a measurement tube, the improvement comprising
an air filter having a peripheral wall defining an interior space inside said peripheral wall;
a division wall separating said interior space of said air filter from said pulsation-damping space; and wherein
said measurement tube is axially offset with respect to said intake pipe and passes through said division wall
said measurement tube has an outlet opening end which longitudinally overlaps an inlet opening end of said intake pipe, both of said opening ends being located in said pulsation-damping space.

* * * * *